United States Patent [19]
Gorman et al.

[11] Patent Number: 5,934,596
[45] Date of Patent: Aug. 10, 1999

[54] AUTOMATIC LOCKING RETRACTOR WITH TIMING CLUTCH MECHANISM

[75] Inventors: Patrick J. Gorman, White Lake; Phillip D. Yee, Troy; Mark F. Gray, Sterling Heights; Kenneth H. Kohlndorfer, Roseville, all of Mich.

[73] Assignee: Breed Automative Technology, Inc., Lakeland, Fla.

[21] Appl. No.: 09/008,420

[22] Filed: Jan. 16, 1998

[51] Int. Cl.$^6$ .................................................... B60R 22/28
[52] U.S. Cl. .................................... 242/379.1; 242/382.2; 242/382.4; 242/383; 242/384
[58] Field of Search ............................. 242/379.1, 382.1, 242/382.2, 382.4, 383, 274; 280/805, 806, 807

[56] References Cited

U.S. PATENT DOCUMENTS

| | | | |
|---|---|---|---|
| 4,817,885 | 4/1989 | Matsumoto | 242/382.2 |
| 5,526,996 | 6/1996 | Ebner et al. | 242/379.1 |
| 5,628,469 | 5/1997 | Fohl | 242/379.1 |
| 5,671,894 | 9/1997 | Dybro et al. | 242/379.1 |
| 5,788,176 | 8/1998 | Ebner et al. | 242/379.1 |
| 5,794,877 | 8/1998 | Ono et al. | 242/379.1 |
| 5,794,879 | 8/1998 | Huber | 242/382.2 |
| 5,799,893 | 9/1998 | Miller, III et al. | 242/379.1 |
| 5,820,059 | 10/1998 | Hibata et al. | 242/382.4 |

*Primary Examiner*—John P. Darling
*Attorney, Agent, or Firm*—Markell Seitzman

[57] ABSTRACT

A safety belt retractor (10) comprised of a spool (28), a belt (40) wound on the spool (28), a ratchet wheel (48), and a torsion bar (44) interconnecting the spool (28) to the ratchet wheel (48) and capable of yielding in response to loading exerted on the belt (40) when the ratchet wheel (48) is locked against rotation. The safety belt retractor (10) also includes a holdout mechanism (18) which is normally operable in an ELR mode to permit operation of an emergency locking mechanism (16) and which can be selectively shifted into an ALR mode for locking the ratchet wheel (48) against rotation to prevent further payout of the belt (40) after a predetermined length of the belt (40) has been withdrawn from the spool (28). A timing assembly (124) functions to determine when the predetermined length of the belt (40) has been withdrawn or retracted for controlling engagement and disengagement of a latch mechanism (110). A timing clutch mechanism (20) interconnects the torsion bar (44) to the timing assembly (124) and is normally operable for driving the timing assembly (124) in response to withdrawal and retraction of the belt (40). The timing clutch mechanism (20) is further operable to permit relative movement between the torsion bar (44) and the timing assembly (124) for resetting the timing assembly (124) to a predefined set position in response to full retraction of the belt (40) after the torsion bar (44) has yielded. As such, the timing clutch mechanism (20) functions to maintain the predetermined length of the belt (40) required for selective actuation of the holdout mechanism (18) in a manner which is independent of yielding of the torsion bar (44).

14 Claims, 8 Drawing Sheets

5,934,596

AUTOMATIC LOCKING RETRACTOR WITH TIMING CLUTCH MECHANISM

BACKGROUND AND SUMMARY OF THE INVENTION

The present invention relates generally to an occupant restraint system for motor vehicles. More particularly, the present invention is directed to a safety belt retractor having a timing clutch mechanism capable of resetting the timing of an automatic locking mechanism after controlled yielding of an energy management mechanism.

As part of the occupant restraint system currently used in motor vehicles, several different types of safety belt retractors are available which provide enhanced occupant comfort and/or different functional modes. For example, one type of safety belt retractor, often referred to as an emergency locking retractor (ELR), includes a latch mechanism which is automatically actuated in response to certain high acceleration conditions to prevent payout of the safety belt. In some emergency locking retractors, the latch mechanism is actuated by an inertia-sensitive actuator when the vehicle is subjected to a certain deceleration level. In other emergency locking retractors, the latch mechanism is actuated by a web-sensitive actuator when the belt is withdrawn from the spool at a rate exceeding a designated level.

Another type of safety belt retractor, commonly referred to as an automatic locking retractor (ALR), is used for securely tethering a portable child seat to the vehicle seat. Many automatic locking retractors include a holdout mechanism which is selectively activated by withdrawing a predetermined length of the safety belt. Once the predetermined length of the safety belt has been withdrawn, the holdout mechanism engages a latch mechanism to prevent subsequent payout of the safety belt. Thereafter, this locking function is cancelled by disengaging the latch mechanism in response to retraction of the safety belt to its stowed position. Typically, the holdout mechanism includes a timing device for measuring the length of safety belt withdrawn and retracted and controlling actuation and subsequent cancellation of the locking function. In some vehicular seat applications, a dual-mode safety belt retractor is used which normally operates as an ELR retractor until the holdout mechanism is actuated for switching to operation as an ALR retractor.

Safety belt retractors may also include an energy management mechanism which functions to absorb a portion of the energy (i.e. impact loads) transferred from the safety belt to the seat occupant during a collision. For example, some energy management retractors include a torsion bar having a first end fixed to the spool. During a collision, the latch mechanism engages the second end of the torsion bar. As such, the loading force applied by the seat occupant to the safety belt is transferred to the spool and causes the first end of the torsion bar to yield (i.e. twist) relative to the latched second end. Such torsional yielding of the torsion bar results in a limited amount of additional rotation of the spool which, in turn, permits a corresponding additional length of the safety belt to be withdrawn from the retractor. The controlled payout of additional belt in response to loading on the safety belt effectively dampens the amount of impact energy transferred to the seat occupant. However, this additional length of belt may affect subsequent operation of the timing device associated with the holdout mechanism by requiring an additional amount of the safety belt to be withdrawn and retracted to respectively actuate and cancel the locking function.

In view of the above, it is an object of the present invention to provide a safety belt retractor equipped with an energy management mechanism capable of yielding to absorb a portion of the impact energy generated during a collision, and a timing clutch mechanism capable of resetting the timing assembly of a holdout mechanism in response to full retraction of the safety belt after the energy management mechanism has yielded.

Accordingly, the present invention is directed to a safety belt retractor comprised of a spool, a belt wound on the spool, a ratchet wheel, a torsion bar interconnecting the spool to the ratchet wheel and which is capable of yielding in response to loading exerted on the belt when the ratchet wheel is locked against rotation, and an emergency locking mechanism normally operable in a released mode to permit payout of the belt and which is automatically shifted into a locked mode for locking the ratchet wheel against rotation to prevent payout of the belt in response to the occurrence of a high acceleration condition. The safety belt retractor also includes a holdout mechanism which is normally operable in an ELR mode to permit operation of the emergency locking mechanism and which can be selectively shifted into an ALR mode for locking the ratchet wheel against rotation to prevent further payout of the belt after a predetermined length of the belt has been withdrawn from the spool. Subsequent retraction of the predetermined length of the belt shifts the holdout mechanism from its ALR mode into its ELR mode. A timing assembly associated with the holdout mechanism functions to determine when the predetermined length of the belt has been withdrawn or retracted for controlling engagement and disengagement of a latch mechanism. A timing clutch mechanism interconnects the torsion bar to the timing assembly and is normally operable for driving the timing assembly in response to withdrawal and retraction of the belt. The timing clutch mechanism is further operable to permit relative movement between the torsion bar and the timing assembly for resetting the timing assembly to a predefined set position in response to full retraction of the belt after the torsion bar has yielded. As such, the timing clutch mechanism functions to maintain the predetermined length of the belt required for selective actuation of the holdout mechanism in a manner which is independent of yielding of the torsion bar.

BRIEF DESCRIPTION OF THE DRAWINGS

The present invention will become more fully understood from analysis of the following detailed description and the accompanying drawings wherein.

DETAILED DESCRIPTION OF THE DRAWINGS

Figure 1:
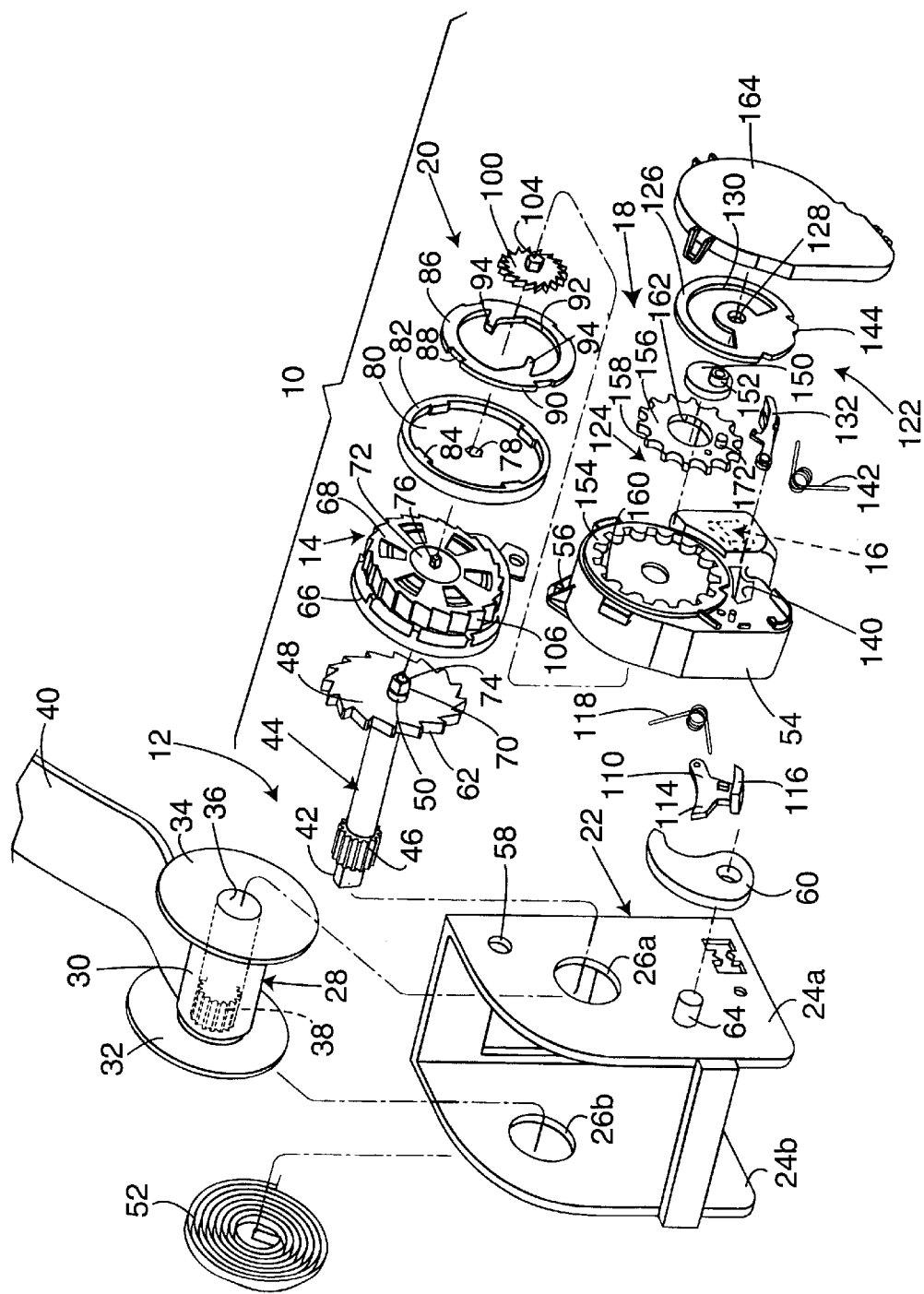
FIG. 1 is an exploded perspective view of a safety belt retractor according to the present invention.

Referring to the drawings, a safety belt retractor 10 is shown which is adapted for use with a safety belt restraint system of the type typically used in motor vehicles. As will be detailed, retractor 10 includes an energy management mechanism 12 that is operable for transferring a portion of the impact energy exerted by the seated occupant on the safety belt during a vehicular collision to a yieldable structure for effectively absorbing (i.e., damping) a portion of the reaction loads exerted on the seated occupant. Retractor 10 also includes a belt-sensitive emergency locking mechanism 14 and a vehicle-sensitive emergency locking mechanism 16, both of which function to prevent payout of the safety belt when an acceleration condition exceeds a predetermined level. Retractor 10 includes an automatic locking mechanism, hereafter referred to as child seat holdout mechanism 18, which can be selectively activated by withdrawing a predetermined length of the safety belt to prevent payout of the safety belt, regardless of the existence or severity of an acceleration condition, for use in securing a portable child seat to the vehicle seat. Holdout mechanism 18 can be subsequently de-activated by retracting the predetermined length of the safety belt. Finally, retractor 10 includes a timing clutch mechanism 20 which interconnects energy management mechanism 12 to holdout mechanism 18 in such a way to compensate for yielding of energy management mechanism 12.

As best seen from FIG. 1, retractor 10 includes a frame 22 which is adapted to be anchored to suitable frame structure of the seat assembly or the vehicle and which has a pair of laterally-spaced walls 24A and 24B with corresponding apertures 26A and 26B formed therein. Retractor 10 also includes a spool 28 having a tubular shaft segment 30 and a pair of disc-shaped end plates 32 and 34 which are fixed to opposite ends of shaft segment 30. A throughbore 36 is formed through shaft segment 30 and end plates 32 and 34 of spool 28 and includes internal splines 38 which are formed adjacent to end plate 32. As seen, one end of a safety belt 40 is secured to shaft segment 30 of spool 28. While not shown, the other end of safety belt 40 is anchored in a conventional fashion such that a tongue plate slidably mounted thereon can be releasably latched to a belt buckle for securing a person or a portable child seat to the vehicle seat.

To rotatably mount spool 28 to frame 22, a first end segment 42 of a torsion bar 44 is routed through aperture 26A in wall 24A, throughbore 36 in spool 28, and aperture 26B in wall 24B such that its external splines 46 mesh with internal splines 38. Thus, torsion bar 44 is fixed for rotation with spool 28. A ratchet wheel 48 is fixed adjacent to a second end segment 50 of torsion bar 44. In addition, a rewind spring 52 is provided adjacent to an outer surface of wall 24B and has one end fixed to first end segment 42 of torsion bar 44 or end plate 32 and has its opposite end fixed to frame 22. Rewind spring 52 functions to normally bias spool 28 for rotation in a first or belt-rewind (i.e., clockwise in the drawings) direction and exert a retractive force on belt 40 which assists in winding belt 40 onto spool 28.

With continued reference to FIG. 1, retractor 10 is shown to include a housing 54 which is adapted to be secured to wall 24A of frame 22 such as by posts 56 snapped into apertures 58. Housing 54 defines an enclosed space with wall 24A within which belt-sensitive emergency locking mechanism 14, vehicle-sensitive emergency locking mechanism 16, and timing clutch mechanism 20 are located. Belt-sensitive emergency locking mechanism 14 is conventional and is operably associated with ratchet wheel 48 for causing movement of a first lock pawl 60 between a first position displaced from teeth 62 of ratchet wheel 48 and a second position engaging teeth 62 on ratchet wheel 48. First lock pawl 60 is pivotably supported on a post 64 extending from wall 24A of frame 22 and is normally biased to its first position. When first lock pawl 60 is in its first position, bi-directional rotation of spool 28 is permitted so as to define a released mode for belt-sensitive emergency locking mechanism 14. Belt-sensitive emergency locking mechanism 14 is operable to move first lock pawl 60 to its second position when the acceleration of spool 28 caused by rapid withdrawal of belt 40 exceeds a predetermined acceleration value. When first lock pawl 60 is in its second position, spool 28 is prevented from rotating in a second or belt-unwind (i.e. counter-clockwise in the drawings) direction, thereby preventing payout of safety belt 40. However, spool 28 can still be rotated in its belt-rewind direction. As such, movement of first lock pawl 60 to its second position defines a locked mode for belt-sensitive emergency locking mechanism 14. While the particular structure of belt-sensitive emergency locking mechanism 14 is not critical to the present invention, it is shown to include a lock ring 66, a toothed inertia ring 68, and speed-sensing actuator components therebetween.

Figure 6:
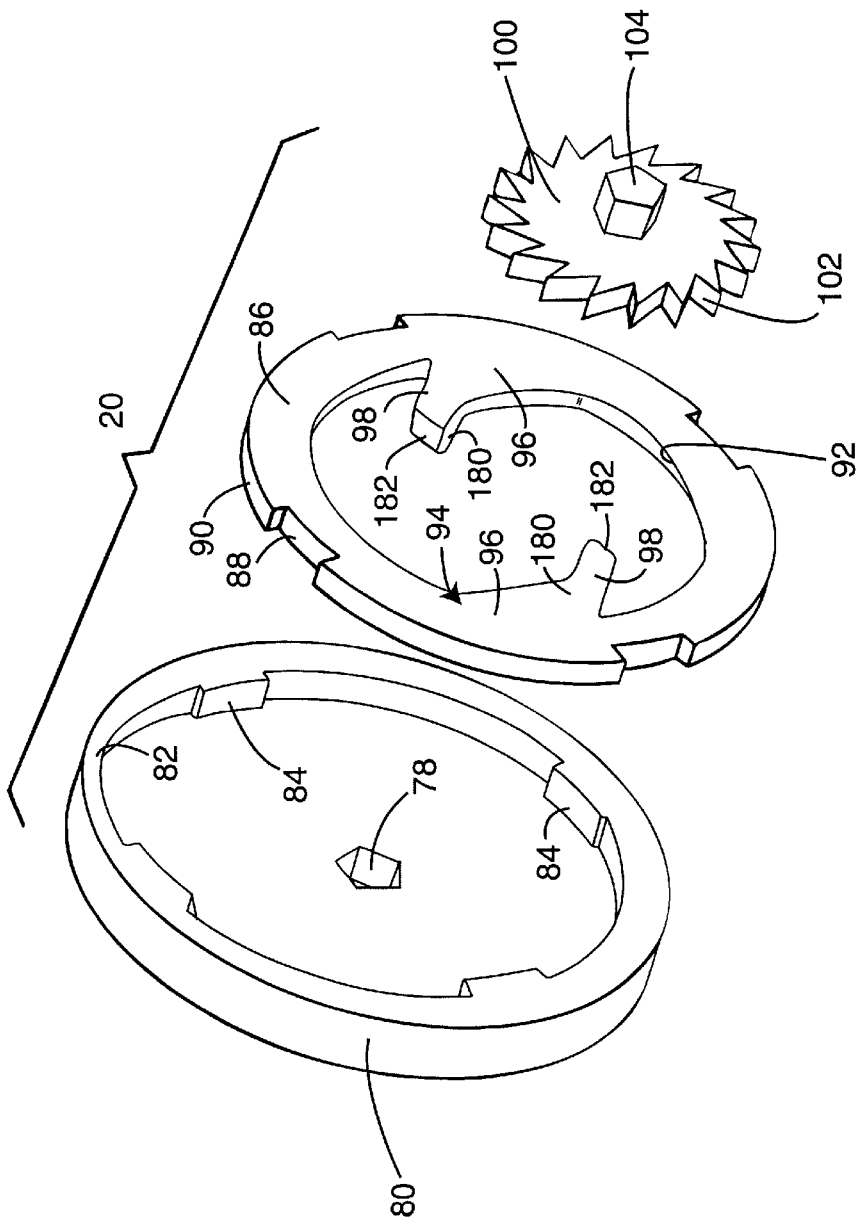
FIG. 6 is an enlarged partial view of FIG. 1 showing the components of the timing clutch mechanism in greater detail.
Figure 7:
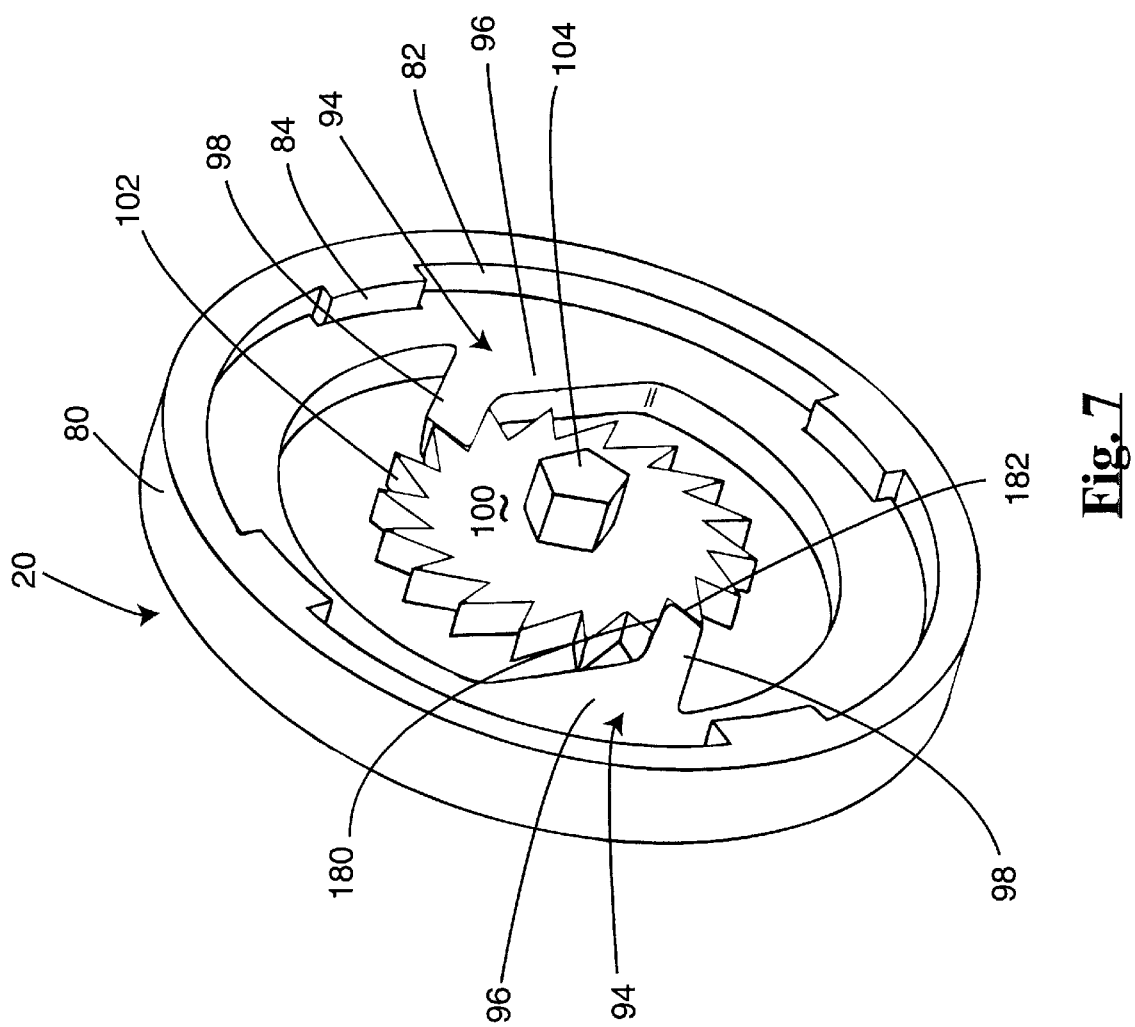
FIG. 7 is an assembled perspective view of the components shown in FIG. 6.

A post 70 extending axially from second end segment 50 of torsion bar 44 is adapted to extend through apertures formed in lock ring 66 and inertia ring 68. A drive ring 72 has a first key (not shown) retained in a keyway aperture 74 formed in post 70 and a second key 76 which is retained in a keyway aperture 78 formed in a clutch ring 80 associated with clutch mechanism 20. Thus, clutch ring 80 is fixed for rotation with ratchet wheel 48 and torsion bar 44. Clutch ring 80 has an annular flange 82 from which a series of radial lugs 84 extend. A clutch plate 86 is adapted to be located within the chamber defined by flange 82 and includes a corresponding series of notches 88 formed in its outer peripheral surface 90. Lugs 84 are sized for retention within notches 88 such that clutch plate 86 is fixed for common rotation with clutch ring 80. Clutch plate 86 has a central aperture 92 from which a pair of cantilevered fingers 94 extend in an opposed orientation. As best seen from FIGS. 6 and 7, fingers 94 each include a root segment 96 and a tooth segment 98. Timing clutch mechanism 20 also includes a ratchet gear 100 having ratchet teeth 102 which engage tooth segments 98 of fingers 94. Tooth segments 98 of each fingers 94 are radially resilient so as to maintain loaded engagement with ratchet teeth 102 and yet permit sufficient deflection to accommodate unidirectional relative rotary movement between clutch plate 86 and ratchet gear 100. Ratchet gear 100 is shown to also include a drive key 104 extending outwardly therefrom.

Vehicle-sensitive emergency locking mechanism 16 is also conventional and includes an inertia mass, shown in phantom, which responds to its own inertia when the vehicle (and retractor 10) is accelerated (positively or negatively) in excess of a predefined acceleration level for moving a second lock pawl (not shown) from a first position displaced from ratchet teeth 106 on inertia ring 68 to a second position engaged with ratchet teeth 106 on inertia ring 68. When the second lock pawl is in its first position, bi-directional rotation of spool 28 is permitted to define a released mode for vehicle-sensitive emergency locking mechanism 16. In contrast, movement of the second lock pawl to its second position permits rotation of spool 28 only in its belt-rewind direction, thereby permitting ret preventing withdrawal of belt 40 so as to define a locked mode for vehicle-sensitive emergency locking mechanism 16.

Holdout mechanism 18 is shown to include a third lock pawl 110 is mounted on a pin 112 extending from lock ring 66 for pivotal movement between an unlatched position and a latched position. Third lock pawl 110 includes a latch segment 114 and an actuation segment 116. A first torsion spring 118 acts between third lock pawl 110 and lock ring 66 for normally urging third lock pawl 110 toward its unlatched position. With third lock pawl 110 in its unlatched position, latch segment 114 is displaced from teeth 62 on ratchet wheel 48. In operation, holdout mechanism 18 acts as a mode shifting mechanism which can be selectively activated to move third lock pawl 110 from its unlatched position to its latched position for shifting retractor 10 from operation in an emergency locking retractor (ELR) mode into an automatic locking retractor (ALR) mode. Likewise, holdout mechanism 18 can be de-activated to move third lock pawl 110 from its latched position to its unlatched position for shifting retractor 10 from its ALR mode into its ELR mode.

To provide means for shifting retractor 10 between its ELR and ALR modes, holdout mechanism 18 includes a cam assembly 122 and a timing assembly 124. In general, cam assembly 124 is operable for selectively moving third lock pawl 110 from its unlatched position to its latched position, in opposition to the biasing of first torsion spring 118, after a predetermined length of belt 40 has been unwound from spool 28. Additionally, cam assembly 122 is also operable to permit first torsion spring 118 to move third lock pawl 110 from its latched position to its unlatched position after the predetermined length of belt 40 has been subsequently rewound onto spool 28. According to the embodiment shown, cam assembly 122 includes a cam wheel 126 having a central aperture 128 and an arcuate lost-motion slot 130, and a cam follower 132 pivotably supported on a post 134 extending from housing 54. Cam follower 132 includes a first leg 136 and a second leg 138 which extends through an opening 140 formed in housing 54. A second torsion spring 142 acts between housing 54 and cam follower 132 for urging first leg 136 into continuous engagement with a portion of the outer peripheral edge of cam wheel 126. In particular, the outer peripheral edge of cam wheel 126 defines a cam surface 144, the contour of which controls whether or not second leg 138 of cam follower 132 engages actuation segment 116 of third lock pawl 110.

As noted, holdout mechanism 18 also includes timing assembly 124 which controls actuation of cam assembly 122 based on whether the predetermined length of belt 40 has been withdrawn from or retracted onto spool 28. In particular, timing assembly 124 includes a gerotor-type reduction mechanism which is operable for controlling engagement of first leg 136 of cam follower 132 with cam surface 144 as a function of the length of belt 40 which is wound on spool 28. Timing assembly 124 also includes an eccentric ring 150 having a central keyway aperture (not shown) adapted to non-rotatably receive drive key 104 of ratchet gear 100. An eccentric journal pin 152 extends outwardly from eccentric ring 150 and is adapted to be supported in central aperture 128 of cam wheel 126. Timing assembly 124 also includes a ring gear 154 integrally formed in housing 54, and a stator ring 156 having external gear teeth 158 meshed with internal gear teeth 160 of ring gear 154. Stator ring 156 also includes a central aperture 162 within which eccentric ring 150 is journally supported. Under normal circumstance, rotation of spool 28 causes concurrent rotation of ratchet gear 100 which, in turn, causes eccentric rotation of eccentric ring 150. Such rotation of eccentric ring 150 causes stator ring 156 to rotate eccentrically about ring gear 154 at a reduced ratio and in an opposite direction relative to spool 28. A cover plate 164 is adapted for attachment to housing 54 to enclose cam assembly 122 and timing assembly 124 therein.

Figure 2:
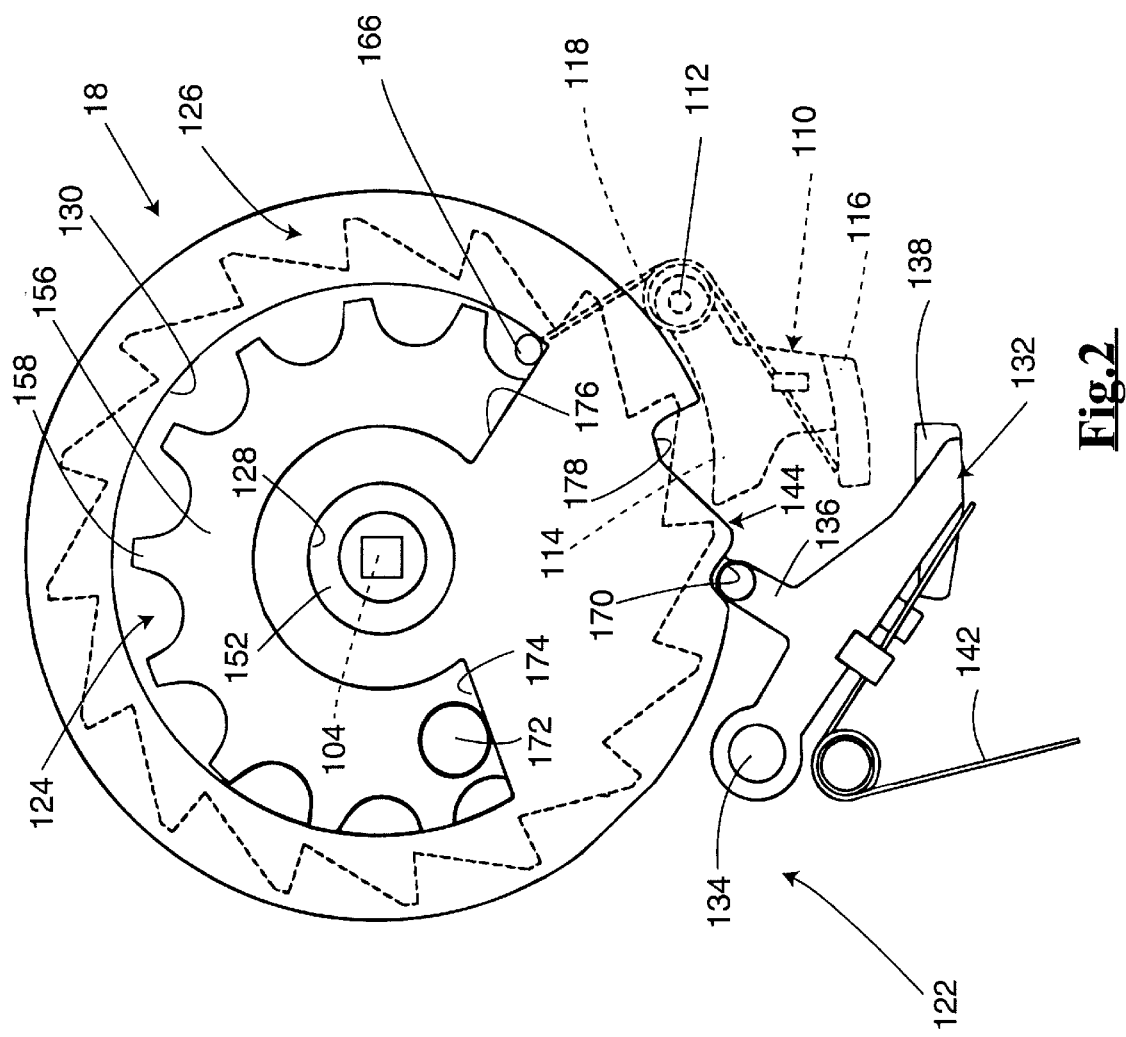
FIGS. 2 through 5 illustrate the position of various components of the safety belt retractor for selectively activating the child seat holdout mechanism to shift the retractor between operation in an ELR mode and operation in an ALR mode.
Figure 3:
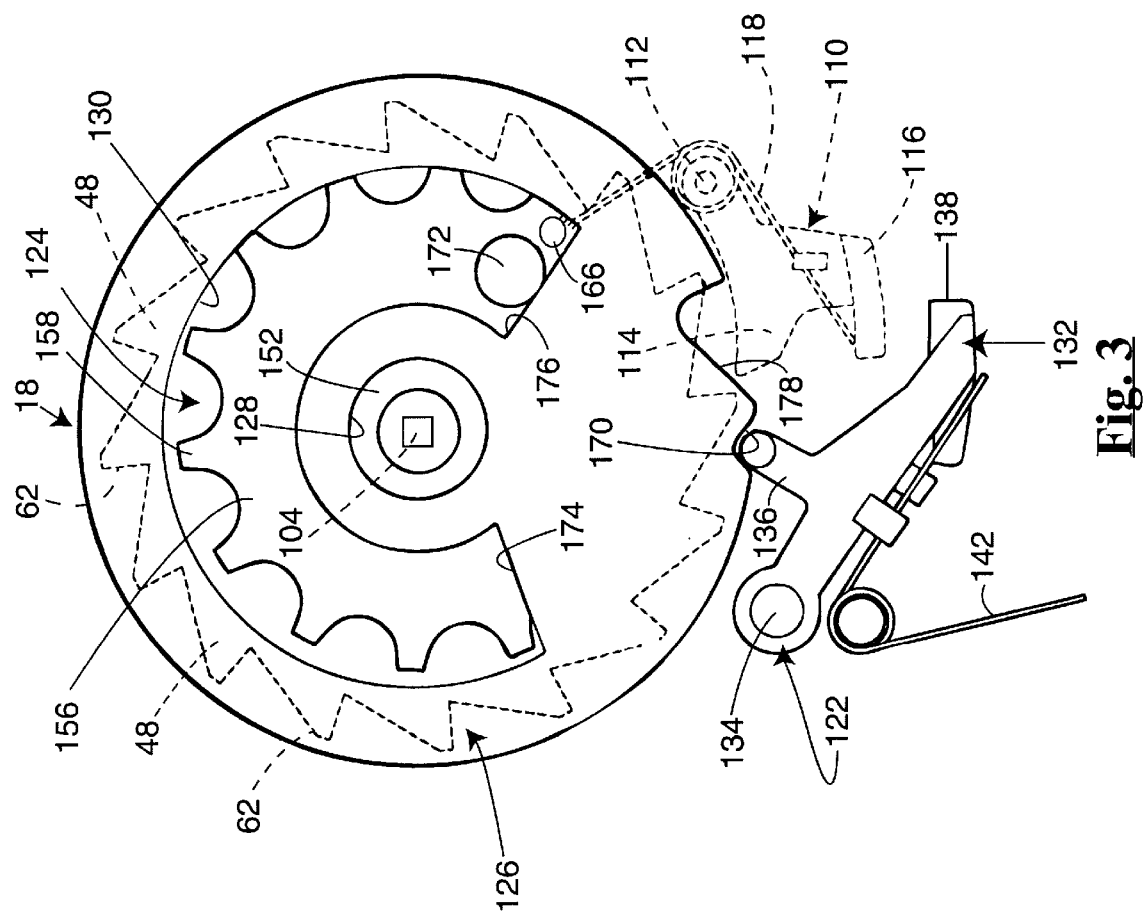
Figure 4:
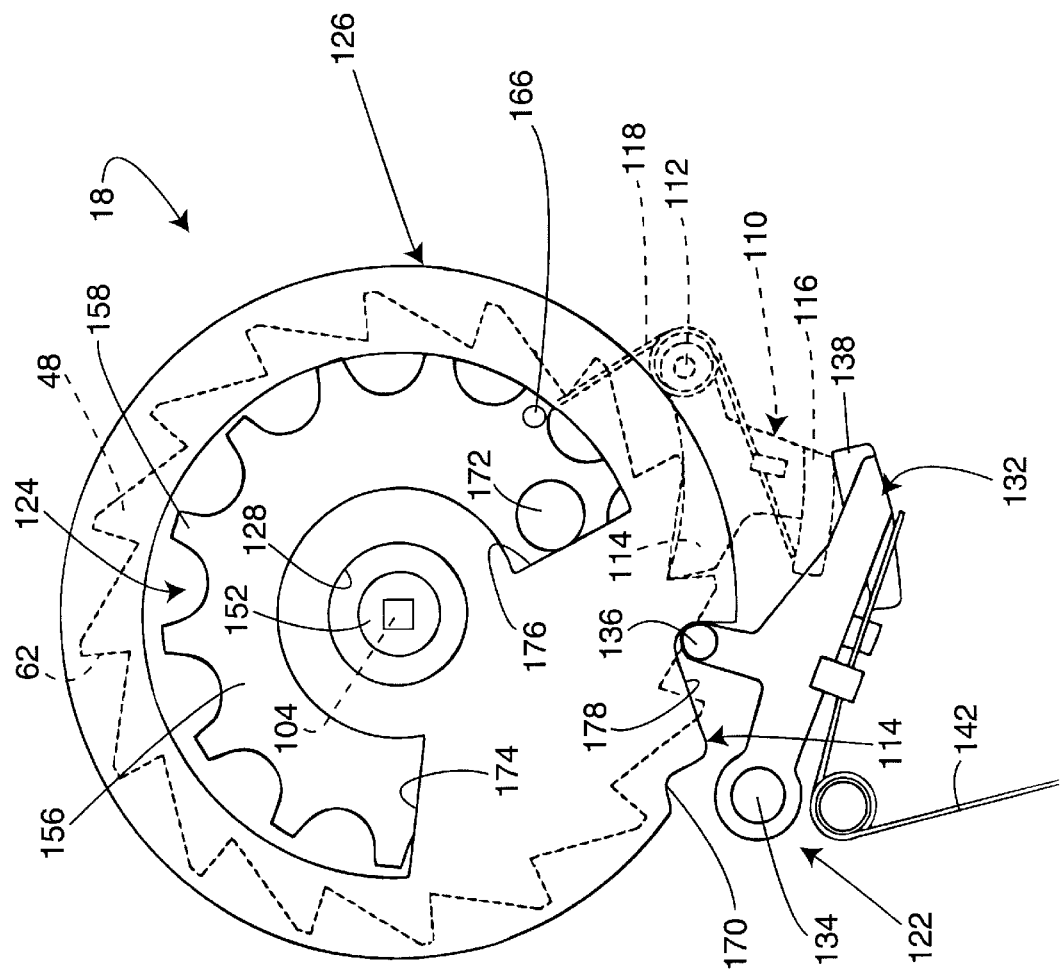

With reference to FIGS. 2 through 4, the operational modes available with safety belt retractor 10 will now be described. In particular, FIG. 2 illustrates the components associated with holdout mechanism 18 in a non-activated mode and safety belt 40 fully retracted to its home (i.e. stowed) position wound on spool 28. With holdout mechanism 18 in the non-activated mode, retractor 10 operates in its ELR mode such that belt 40 can be freely withdrawn and retracted. As shown, third lock pawl 110 is held by first torsion spring 118 in its unlatched position while first leg 136 of cam follower 132 is biased by second torsion spring 142 into engagement with a first detent 170 formed in cam surface 144 of cam wheel 126 for holding cam wheel 126 in an ELR position. The depth of first detent 170 is selected to maintain second leg 138 of cam follower 132 in a position displaced from actuation segment 116 of third lock pawl 110. In addition, a cam post 172 extending from stator ring 156 is positioned in lost-motion slot 130 of cam wheel 126 adjacent to a first terminal end 174 thereof such that timing assembly 124 is shown in an initial set position. Thereafter, as safety belt 40 is withdrawn from its stowed position, spool 28 and ratchet wheel 48 are rotated in a counter-clockwise direction which causes stator ring 156 to rotate eccentrically in a clockwise direction and at a reduced rate which, in turn, causes cam post 172 to travel within lost-motion slot 130 away from its first terminal end 174.

FIG. 3 illustrates the components of cam assembly 122 and timing assembly 124 when holdout mechanism 18 is still in its non-activated mode and a length of belt 40 has been withdrawn for locating cam post 172 adjacent to second terminal end 176 of slot 130 while first leg 136 of cam follower 132 is maintained in engagement with first detent 170. Thus, the length of belt 40 required to rotate spool 28 sufficiently to move cam post 172 from the position shown in FIG. 2 to the position shown in FIG. 3 is the maximum length which can be withdrawn from spool 28 to maintain holdout mechanism 18 in its non-activated mode such that retractor 10 operates in its ELR mode.

When it is desired to switch retractor 10 into its ALR mode, holdout mechanism 18 is shifted into its activated mode by withdrawing a length of belt 40 from retractor 10 which is sufficient to move timing assembly 124 from the initial set position (FIG. 2) to an actuated position (FIG. 4). In particular, such withdrawal of belt 40 causes cam post 172 to engage second terminal end 176 of lost-motion slot 130 and rotate cam wheel 126 in a clockwise direction from the ELR position shown in FIGS. 2 and 3 to an ALR position shown in FIG. 4. Such rotation of cam wheel 126 causes first leg 136 of cam follower 132 to exit first detent 170 and enter into a second detent 178 formed in cam surface 144. When first leg 136 of cam follower 132 is biased by second torsion spring 142 into engagement with second detent 178, its second leg 138 engages actuation segment 116 of third lock pawl 110 so as to forcibly move third lock pawl 110 from its unlatched position to its latched position, in opposition to the biasing of first torsion spring 118, thereby shifting holdout mechanism 18 from its non-activated mode into its activated mode. Since the biasing force of second torsion spring 142 is greater than that of first torsion spring 118, cam follower 132 holds third lock pawl 110 in its latched position. As noted, movement of third pawl 110 to its latched position causes latch segment 114 to move into engagement with teeth 62 on ratchet wheel 48 for preventing further payout of belt 40 while permitting subsequent retraction thereof. The length of belt 40 required to rotate spool 28 sufficiently to cause timing assembly 124 to move cam post 172 from the position shown in FIG. 2 to the position shown in FIG. 4 defines the predetermined length of safety belt 40 which must be withdrawn from spool 28 to shift holdout mechanism 18 out of its non-activated mode and into its activated mode. As noted, with holdout mechanism 18 in its activated mode, retractor 10 operates in its ALR mode.

When it is desired to return retractor 10 to operation in its ELR mode, holdout mechanism 18 shifted into its non-activated mode by fully retracting belt 40 to its stowed position. Such full retraction of belt 40 causes clockwise rotation of spool 28 and ratchet wheel 48 and corresponding counter-clockwise rotation of stator ring 156. This counter-clockwise rotation of stator ring 156 causes cam post 172 to move in lost-motion slot 130 and engage first terminal end 174 thereof for rotating cam wheel 126 in a counter-clockwise direction to the ELR position shown in FIG. 2. This rotation of cam wheel 126 causes first leg 136 of cam follower 132 to exit second detent 178 and enter into engagement with first detent 170, whereby second leg 138 of cam follower 132 is moved to the position displaced from actuation segment 116 of third lock pawl 110. As such, first torsion spring 118 urges third lock pawl 110 to move to its unlatched position, thereby shifting holdout mechanism 18 from its activated mode into its non-activated mode. Further counter-clockwise rotation of cam wheel 126 past its ELR position is prevented due to engagement of a stop post 166 extending inwardly from cover plate 164 with second terminal end 176 of slot 130.

Figure 5:
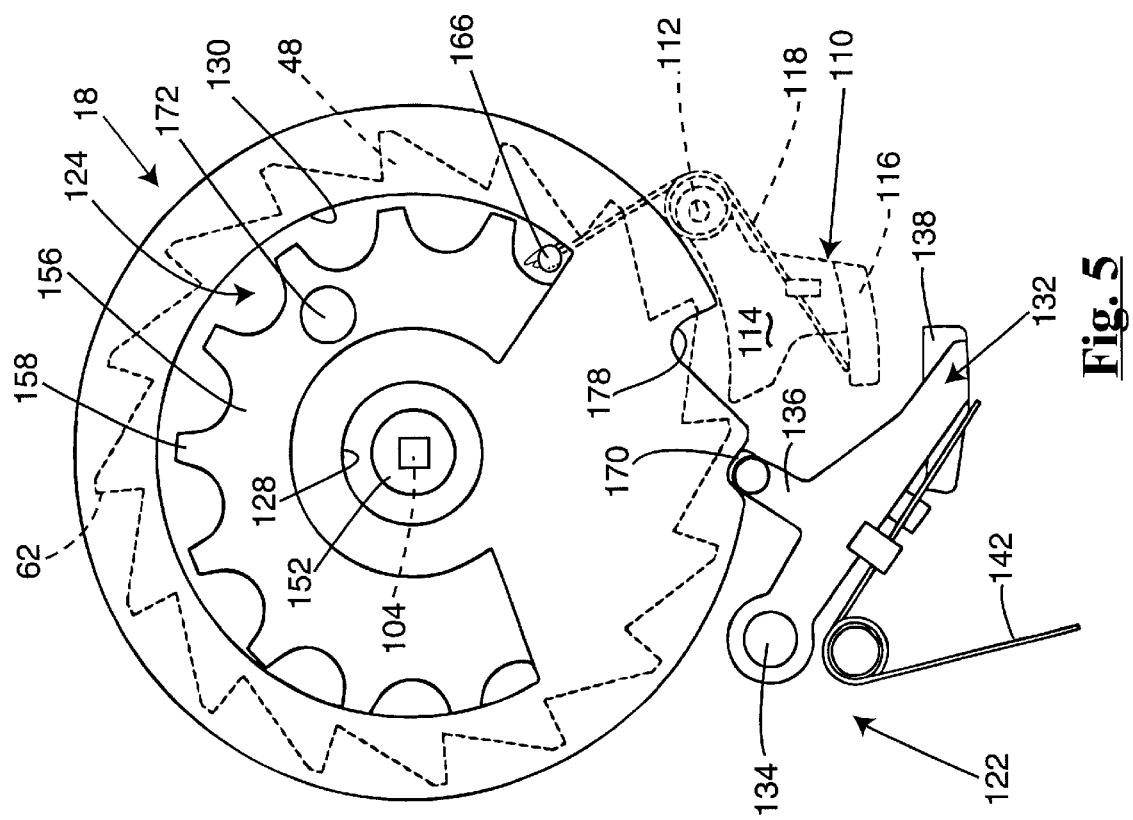

Referring now to FIG. 5 through 8, the function of timing clutch mechanism 20 will be described in greater detail. In particular, FIG. 5 illustrates the position of the components associated with cam assembly 122 and timing assembly 124 when a length of belt 40 has been withdrawn from retractor 10 and is latched across the torso of a seat occupant and holdout mechanism 18 is operating in its non-activated mode. As seen, cam wheel 126 is in its ELR position, such that retractor 10 is operating in its ELR mode. Upon the occurrence of a vehicular collision, at least one of emergency locking mechanisms 14 and 16 is actuated and shifted into its locked mode. Due to incorporation of energy management mechanism 12 into retractor 10, loading exerted by the seat occupant on belt 40 during the impact causes spool 28 and first end segment 42 of torsion bar 44 to torsionally yield (i.e. twist) in a counter-clockwise direction relative to ratchet wheel 48 which has been latched against movement. This twisting permits an additional length of belt 40 to be paid-out from retractor 10 in a controlled manner for absorbing a portion of the impact load applied to the seat occupant. Upon release of belt 40 following the collision, retraction of the original length of belt 40 causes spool 28, torsion bar 44, ratchet wheel 48, clutch ring 80 and clutch plate 86 to be rotated in the clockwise direction by rewind spring 52. Since tooth segment 98 of fingers 94 are meshed with ratchet teeth 102 of ratchet gear 100, such clockwise rotation of clutch plate 86 causes ratchet gear 100 to also rotate in a clockwise direction which, in turn, causes rotation of stator ring 156 in the counter-clockwise direction. The rotation of stator ring 126 due to retraction of the original length of belt 40 causes cam post 172 to move within lost-motion slot 130 until it engages first terminal end 174 thereof. At this point, engagement of second terminal end 176 of slot 130 against stop pin 166 prevents further counter-clockwise rotation of cam wheel 126, thereby holding cam wheel 126 in its ELR position. With cam wheel 126 held in its ELR position, timing assembly 124 is also held in its set position since stator ring 156 and ratchet gear 100 are braked against further rotation in the counter-clockwise direction.

To accommodate the additional length of belt 40 to be rewound onto spool 28 due to the twisting of torsional bar 44, rewind spring 52 causes continued rotation of spool 28 and clutch ring 80 in the clockwise direction. This additional rotation causes clutch plate 86 to also be rotated in a clockwise direction. However, since ratchet gear 100 is held by stator ring 156 against clockwise rotation, such continued rotation of clutch plate 86 causes tooth segments 98 of fingers 94 to ratchet over teeth 102 on ratchet gear 100 until rewind spring 52 has fully rewound belt 40 on spool 28. As such, clutch plate 86 is permitted to rotate relative to ratchet gear 100 when ratchet gear 100 is braked against rotation, thereby holding timing assembly 124 in its initial set position while the additional length of belt 40 is rewound onto spool 28. Tooth segments 98 of fingers 94 are shown to include a cam surface 180 adapted to ratchet over teeth 102 of ratchet gear 100, and a lock surface 182 adapted to lockingly engage teeth 102 of ratchet gear 100. Once belt 40 is fully retracted to its stowed position, subsequent withdrawal of belt 40 causes counter-clockwise rotation of spool 28, torsion bar 44, clutch ring 80, and clutch plate 86 such that fingers 94 engage teeth 102 of ratchet gear 100 to cause concurrent driven counter-clockwise rotation of ratchet gear 100. Such counter-clockwise rotation of ratchet gear 100 causes eccentric ring 150 to be driven in the clockwise direction such that timing assembly 124 is activated. Thus, timing clutch mechanism 20 functions to maintain the predetermined length of belt 40 required to activate/de-activated holdout mechanism 18 by resetting the timing of timing assembly 124 after each collision which causes torsion bar 44 to twist.

Figure 8:
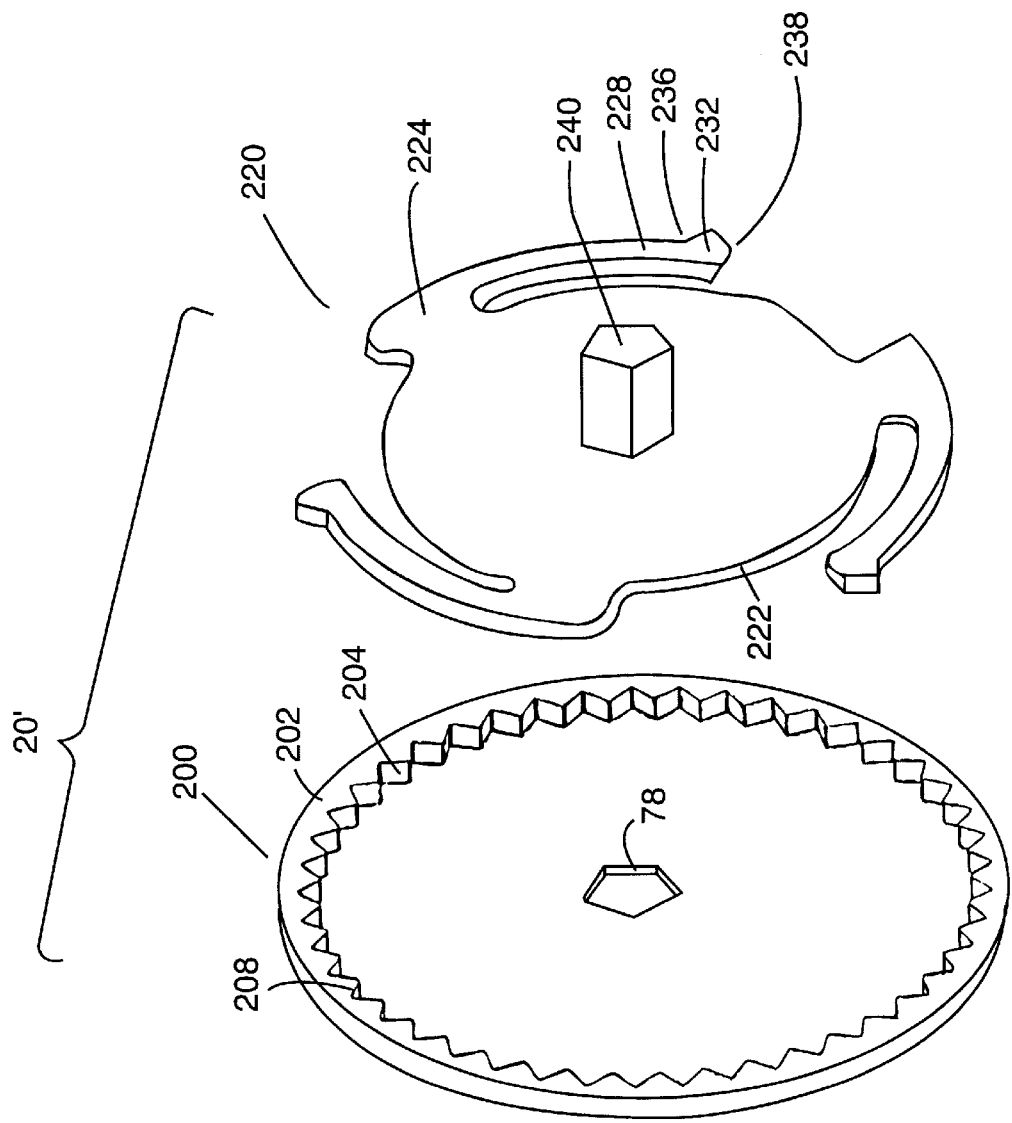
FIG. 8 illustrates an alternative clutch mechanism.

Reference is made to FIG. 8, which illustrates an alternative clutch mechanism. Similar to rotation of the clutch ring 80, the clutch housing 200 is rotated in a clockwise direction with the spool 28. The clutch housing 200 having an annular flange 202, which has an interior surface 204, with teeth 208 disposed on the interior surface 204. A clutch plate 220 is disposed within the annular flange 202, having radially located fingers 228, each finger having an engaging tooth 232. The engaging teeth 232 engage the teeth 208 of clutch housing 200 to cause concurrent driven counter-clockwise rotation of clutch plate 220. The clutch plate 220 is held by stator ring 156 against clockwise rotation, such continued rotation of clutch housing 200 causes tooth segments 232 of fingers 228 to ratchet over teeth 208 on clutch housing 200 until rewind spring 52 has fully rewound belt 40 on spool 28. As such, clutch housing 200 is permitted to rotate relative to clutch plate 220, when clutch plate 220 is braked against rotation, thereby holding timing assembly 124 in its initial set position while the additional length of belt 40 is rewound onto spool 28. The tooth segments 232 of fingers 228 are shown to include a cam surface 236 adapted to ratchet over the teeth 208 clutch housing 200, and a lock surface 238 adapted to lockingly engage teeth 208 of clutch housing 200. Once belt 40 is fully retracted to its stowed position, subsequent withdrawal of belt 40 causes counter-clockwise rotation of spool 28, torsion bar 44, clutch housing 200, and clutch plate 220 such that fingers 238 engage teeth 204 of clutch housing 200 to cause concurrent driven counter-clockwise rotation of clutch plate 220. Such counter-clockwise rotation of clutch plate 220 causes eccentric ring 150 to be driven in the clockwise direction such that timing assembly 124 is activated. Thus, timing clutch mechanism 20 functions to maintain the predetermined length of belt 40 required to activate/de-activated holdout mechanism 18 by resetting the timing of timing assembly 124 after each collision which causes torsion bar 44 to twist.

The present invention being thus described, it will be obvious to those skilled in the safety belt retractor art that the invention may be varied in many ways. For example, if retractor 10 is build without belt-sensitive emergency locking mechanism 14, then clutch ring 86 could be direct mounted to ratchet wheel 48. Accordingly, this and other variations are not to be regarded as a departure from the spirit and scope of the invention, and all such modifications are intended to be included within the scope of the following claims.

We claim:

1. A safety belt retractor comprising:

a spool (28);

a belt (40) wound on the spool (28) such that rotation of the spool (28) in a first direction results in unwinding of the belt (40) from the spool (28) and rotation of the spool (28) in a second direction results in winding of the belt (40) on the spool (28);

a ratchet wheel (48);

a torsion bar (44) connecting the ratchet wheel (48) to the spool (28) and which is adapted to yield in response to loading exerted on the spool (28) by the belt (40) when the ratchet wheel (48) is locked against rotation in the first direction for permitting the spool (28) to rotate in the first direction relative to the ratchet wheel (48) and unwind an additional length of the belt (40);

a lock pawl (110) movable between a first position whereat bi-directional rotation of the ratchet wheel (48) is permitted and a second position whereat rotation of the ratchet wheel (48) in the first direction is prevented;

a timing assembly (124) movable from a set position when the belt (40) is fully wound on the spool (28) to an actuated position when a predetermined length of the belt (40) is withdrawn from the spool (28) for causing the lock pawl (110) to move from its first position to its second position, and wherein the timing assembly (124) is movable from the actuated position to the set position when the predetermined length of the belt (40) is fully wound on the spool (28) for causing the lock pawl (110) to move from its second position to its first position; and a clutch mechanism (20) connecting the timing assembly (124) for movement between its set and actuated positions in response to bi-directional rotation of the ratchet wheel (48), the clutch mechanism (20) is further operable to permit rotation of the ratchet wheel (48) in the second direction for winding the additional length of the belt (40) caused by yielding of the torsion bar (44) onto the spool (28) when the timing assembly (24) is in its set position.

2. The safety belt retractor of claim 1 wherein the clutch mechanism (20) includes a first member (86) coupled for rotation with the ratchet wheel (48), and a second member (100) coupled for movement with the timing assembly (124), the first member (86) includes engaging means for driveably engaging the second member (100) such that rotation of the ratchet wheel (48) due to the predetermined length of the belt (40) being unwound and subsequently wound on the spool (48) causes movement of the timing assembly (124) between its set and actuated positions, and wherein the engaging means is released from driving engagement with the second member (100) when the timing assembly (124) is in its set position and the ratchet wheel (48) is rotated in the second direction.

3. The safety belt retractor of claim 2 wherein the first member of the clutch mechanism (20) is a clutch plate (86) having a pair of cantilevered fingers (94) extending inwardly from a central aperture (92), and wherein the second member is a ratchet gear (100) having ratchet teeth (102) engaged with the teeth (98) on the fingers (94).

4. The safety belt retractor of claim 3 further comprising stop means for maintaining the timing assembly (124) in its set position after retraction of the predetermined length of the belt (40) so as to brake the ratchet gear (100) from further rotation in the second direction which causes the fingers (94) to cam over the ratchet teeth (102) on the ratchet gear (100) when the ratchet wheel (48) rotates in the second direction to wind the additional length of the belt (40) onto the spool (28).

5. The safety belt retractor of claim 3 wherein the clutch mechanism (20) further comprises a clutch ring (80) fixed to the ratchet wheel (48) and to which the clutch plate (86) is keyed for common rotation.

6. The safety belt retractor of claim 2 further comprising a first spring (118) urging the lock pawl (110) toward its first position, and a cam assembly (122) including a cam wheel (126) having a slot (130) and a cam surface (144), and a cam follower (132) biased by a second spring (142) into engagement with the cam surface (144), the cam surface (144) having a first detent (170) adapted to locate the cam follower (132) in a position displaced from the lock pawl (110) in its first position, the cam surface (144) having a second detent (178) adapted to locate the cam follower (132) into engagement with the lock pawl (110) for moving lock pawl (110) to its second position, and wherein the timing assembly (124) includes a drive member (150) rotatably driven by the second member (100) of the clutch mechanism (20) and a driven member (156) driven by rotation of the drive member (150) and having a post (172) retained within the slot (130) in the cam wheel (126).

7. The safety belt retractor of claim 6 wherein the timing assembly (124) is in its set position when the post (172) is in close proximity to a first end (174) of the slot (130) in the cam wheel (126), a stationary pin (166) engages a second end (176) of the slot (130), and the cam follower (132) engages the first detent (170) such that the first spring (118) biases lock pawl (110) to its first position, and wherein withdrawal of the predetermined length of the belt (40) causes the driven member (156) to be driven by clutch mechanism (20) such that the timing assembly (124) moves to its actuated position whereat the post (172) engages the second end (176) of the slot (130) for forcibly moving the cam wheel (126) from an ELR position to an ALR position which causes the cam follower (132) to move into engagement with the second detent (178).

8. A safety belt retractor comprising:

a spool (28);

a belt (40) wound on the spool (28) such that rotation of the spool (28) in a first direction results in unwinding of the belt (40) from the spool (28) and rotation of the spool (28) in a second direction results in winding of the belt (40) on the spool (28);

a ratchet wheel (48);

a torsion bar (44) connecting the ratchet wheel (48) to the spool (28) and which is adapted to yield in response to loading exerted on the spool (28) by the belt (40) when the ratchet wheel (48) is locked against rotation in the first direction for permitting the spool (28) to rotate in the first direction relative to the ratchet wheel (48) and unwind an additional length of the belt (40);

an emergency locking mechanism (16) normally operable in a released mode to permit bi-directional rotation of the ratchet wheel (48) and which is shifted into a locked mode to prevent rotation of the ratchet wheel (48) in the first direction in response to a high acceleration condition;

a holdout mechanism (18) normally operable in a non-activated mode to permit operation of the emergency locking mechanism (16) and which can be selectively shifted into an activated mode to prevent rotation of the ratchet wheel (48) in the first direction following a predetermined length of the belt (40) being unwound from the spool (28), the holdout mechanism (18) including a lock pawl (110) movable between a first position whereat bi-directional rotation of the ratchet wheel (48) is permitted and a second position whereat rotation of the ratchet wheel (48) in the first direction is prevented, and a timing assembly (124) movable from a set position when the belt (40) is fully wound on the spool (28) to an actuated position when the predetermined length of the belt (40) is withdrawn from the spool (28) for causing the lock pawl (110) to move from its first position to its second position for shifting the holdout mechanism from its non-activated mode into its activated mode, and wherein the timing assembly (124) is movable from its actuated position to its set position when the predetermined length of the belt (40) is wound on the spool (28) for causing the lock pawl (110) to move from its second position to its first position for shifting the holdout mechanism (18) from its activated mode into its non-activated mode; and a clutch mechanism (20) connecting the timing assembly (124) for movement between its set and actuated positions in response to bi-directional rotation of the ratchet wheel (48), the clutch mechanism (20) is further operable to permit rotation of the ratchet wheel (48) in the second direction for winding the additional length of the belt (40) caused by yielding of the torsion bar (44) onto the spool (28) when the timing assembly (24) is in its set position.

9. The safety belt retractor of claim 8 wherein the clutch mechanism (20) includes a first member (86) coupled for rotation with the ratchet wheel (48), and a second member (100) coupled for movement with the timing assembly (124), the first member (86) includes engaging means for driveably engaging the second member (100) such that rotation of the ratchet wheel (48) due to the predetermined length of the belt (40) being unwound and subsequently wound on the spool (48) causes movement of the timing assembly (124) between its set and actuated positions, and wherein the engaging means is released from driving engagement with the second member (100) when the timing assembly (124) is in its set position and the ratchet wheel (48) is rotated in the second direction.

10. The safety belt retractor of claim 9 wherein the first member of the clutch mechanism (20) is a clutch plate (86) having a pair of cantilevered fingers (94) extending inwardly from a central aperture (92), and wherein the second member is a ratchet gear (100) having ratchet teeth (102) engaged with the teeth (98) on the fingers (94).

11. The safety belt retractor of claim 10 further comprising stop means for maintaining the timing assembly (124) in its set position after retraction of the predetermined length of the belt (40) so as to brake the ratchet gear (100) from further rotation in the second direction which causes the fingers (94) to cam over the ratchet teeth (102) on the ratchet gear (100) when the ratchet wheel (48) rotates in the second direction to wind the additional length of the belt (40) onto the spool (28).

12. The safety belt retractor of claim 10 wherein the clutch mechanism (20) further comprises a clutch ring (80) fixed to the ratchet wheel (48) and to which the clutch plate (86) is keyed for common rotation.

13. The safety belt retractor of claim 9 wherein the holdout mechanism (18) further comprises a first spring (118) urging the lock pawl (110) toward its first position, and a cam assembly (122) including a cam wheel (126) having a slot (130) and a cam surface (144), and a cam follower (132) biased by a second spring (142) into engagement with the cam surface (144), the cam surface (144) having a first detent (170) adapted to locate the cam follower (132) in a position displaced from the lock pawl (110) in its first position, the cam surface (144) having a second detent (178) adapted to locate the cam follower (132) into engagement with the lock pawl (110) for moving lock pawl (110) to its second position, and wherein the timing assembly (124) includes a drive member (150) rotatably driven by the second member (100) of the clutch mechanism (20) and a driven member (156) driven by rotation of the drive member (150) and having a post (172) retained within the slot (130) in the cam wheel (126).

14. The safety belt retractor of claim 13 wherein the timing assembly (124) is in its set position when the post (172) is in close proximity to a first end (174) of the slot (130) in the cam wheel (126) and the cam follower (132) engages the first detent (170) such that the first spring (118) biases lock pawl (110) to its first position, and wherein withdrawal of the predetermined length of the belt (40) causes the driven member (156) to be driven by clutch mechanism (20) such that the timing assembly (124) moves to its actuated position whereat the post (172) engages the second end (176) of the slot (130) for forcibly moving the cam wheel (126) from an ELR position to an ALR position which causes the cam follower (132) to move into engagement with the second detent (178).

* * * * *